United States Patent [19]

Okuno

[11] 4,005,458
[45] Jan. 25, 1977

[54] LIGHT MEASURING DEVICE FOR A SINGLE LENS REFLEX CAMERA WITH A PENTAGONAL PRISM

[75] Inventor: Youichi Okuno, Yokohama, Japan

[73] Assignee: Canon Kabushiki Kaisha, Tokyo, Japan

[22] Filed: Oct. 25, 1974

[21] Appl. No.: 518,160

Related U.S. Application Data

[63] Continuation of Ser. No. 288,444, Sept. 12, 1972, abandoned.

[30] Foreign Application Priority Data

Sept. 16, 1971  Japan .............................. 46-72073
Sept. 16, 1971  Japan .............................. 46-72075
Sept. 16, 1971  Japan .............................. 46-72074

[52] U.S. Cl. ................................ 354/155; 354/56; 354/225
[51] Int. Cl.² ................ G03B 19/12; G03B 13/06
[58] Field of Search ............. 354/54, 56, 155, 219, 354/224, 225

[56] References Cited

UNITED STATES PATENTS

| 3,282,178 | 11/1966 | Nelson | 354/56 |
| 3,532,043 | 10/1970 | Shimomura et al. | 354/54 |
| 3,534,671 | 10/1970 | Yamaguch | 354/56 |
| 3,601,477 | 8/1971 | Miyazaki | 350/286 |

*Primary Examiner*—L. T. Hix
*Assistant Examiner*—E. M. O'Connor
*Attorney, Agent, or Firm*—Toren, McGeady and Stanger

[57] ABSTRACT

A light measuring device for a single lens reflex camera wherein a reflection member having a slant surface is provided at the rear of an exit plane of a pentagonal roof prism and locating to be outside of the viewfinder light path, and the effect by undesired incident light is eliminated by a 'mirror formed by the slant surface placed in front of the light receiving element or photosensitive device, which light once enters into the pentagonal prism from the ocular lens and is reflected at the bottom surface thus again comes out of the surface of the pentagonal prism facing the ocular lens to proceed toward the photosensitive device.

15 Claims, 15 Drawing Figures

LIGHT MEASURING DEVICE FOR A SINGLE LENS REFLEX CAMERA WITH A PENTAGONAL PRISM

This is a continuation of application Ser. No. 288,444 filed Sept. 12, 1972, now abandoned.

The present invention relates to a light measuring device of a single lens reflex camera which employs a pentagonal prism to measure other light than the effective light flux at a viewfinder by placing a photo-sensitive device at the rear of such surface of a pentagonal prism of a single lens or eyepice reflex camera as facing an ocular lens.

In a conventional single lens reflex camera with a pentagonal prism the light, which is harmful to light measurement enters into the prism from an ocular lens or eyepiece side, and is internally reflected at a bottom surface thus coming out of the prism from its rear or exit surface again and impinges on a photo-sensitive device or cell such as CdS. Therefore, its measuring accuracy is poor and when the effect of such light is great, the measured amount of light is too large resulting in insufficient exposure for an image photographed by a single lens reflex camera.

As a means for improving the same, one measure taken is placing a mask at each reflective surface of the pentagonal prism and inserting a mask between the pentagonal prism and the ocular lens or eyepiece thereby eliminating a small portion of undesired incident light from the ocular lens side into a light measuring element, but this measure prevents a camera from being made smaller, or lowers the magnification of a finder, and thus it has not been completely satisfactory. There is also a method to provide an independent light measuring element other than the regular light measuring element of the finder which is placed to measure the counter light from the ocular lens or eyepiece for compensation of the amount of the regular light measured, but it has various disadvantages. For example, it is practically difficult to completely measure the counter light from the ocular lens and it requires an extra photocell and a compensation circuit.

In a conventional type of single lens reflex camera in which light flux is measured at rear of the ocular side of a pentagonal roof prism or at both sides of an ocular lens as mentioned above, a disadvantage has been that counter light from the ocular lens is received in the prism.

DETAILED DESCRIPTION

Figure 1:
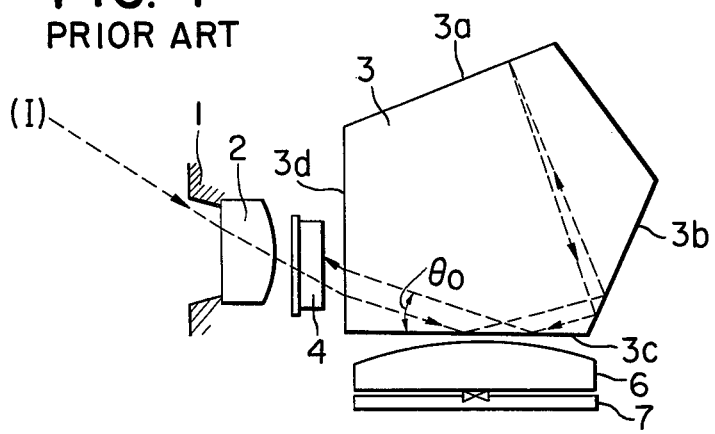
FIGS. 1 and 2 are side views respectively of a light measuring device for a conventional single lens reflex camera showing reflection of undesired light within a pentagonal prism.

Explanation shall be made in reference to FIG. 1, in which 1 is an ocular lens frame, 2 is an ocular lens, 3 is a pentagonal roof prism, $3a$ is a roof or surface, $3b$ is a front plane or surface, $3c$ is a bottom plane, $3d$ is a plane or surface or eyepiece at ocular side and forms an exit surface, 4 is a light receiving element such as a photo-sensitive device such as a CdS cell, 6 is a condenser lens, and 7 is a focusing plate.

Figure 2:
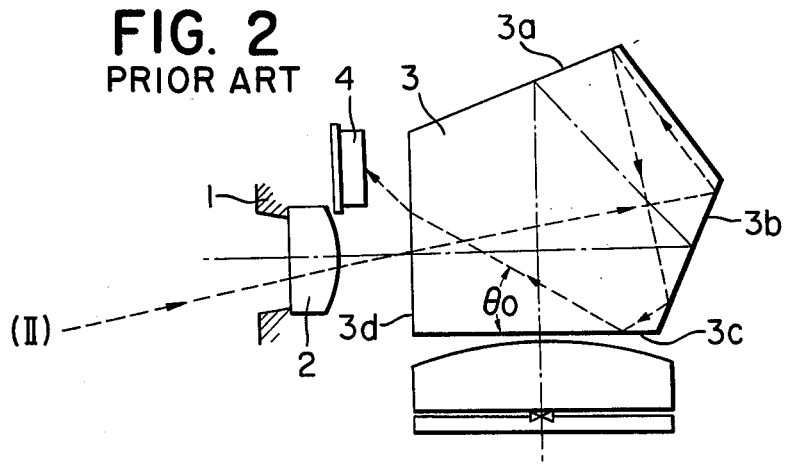

That is, the light flux of the counter upper light I (shown by broken line) from the ocular lens 2 is determined by the ocular lens frame 1 and goes through the ocular lens 2, then is internally reflected within the pentagonal roof prism 3 in the order of $3d \rightarrow 3c \rightarrow cb \rightarrow 3a \rightarrow 3b \rightarrow 3c \rightarrow 3d$, thus enters into the photocell exit surface 4 from $3d$. Or as shown in FIG. 2 the lower light flux (II) goes through the ocular lens 2 and is internally reflected within the pentagonal prism in the order of the plane $3b \rightarrow 3a \rightarrow 3b \rightarrow 3c \rightarrow 3d$, then enters into the photocell 4 from the exit surface $3d$. In both cases such light flux overlaps with the regular light from the focusing plate 7, causing measuring error by the photocell 4, and as a result it causes insufficient exposure in photographing.

Figure 3:
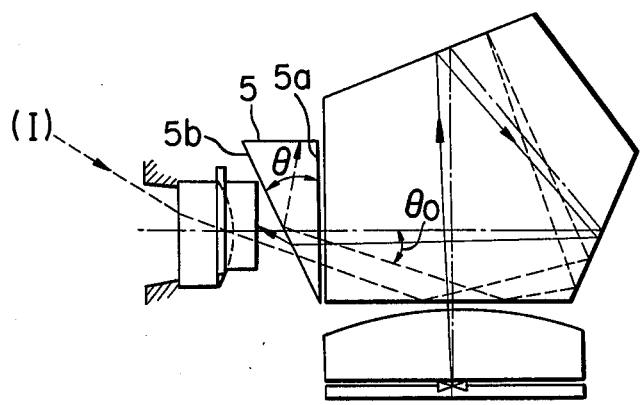
FIG. 3 is a side view of a light measuring device for a single lens reflex camera according to an embodiment of the invention.
Figure 4:
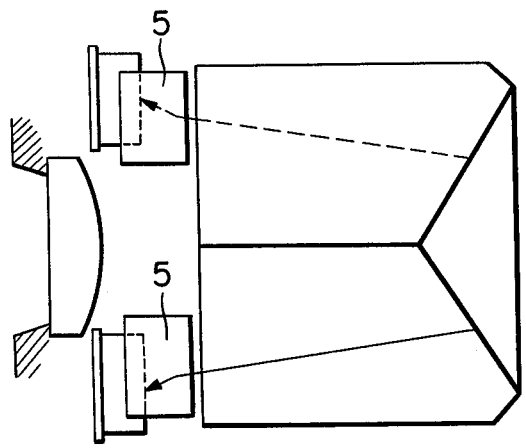
FIG. 4 is a top view of the invention of FIG. 3.

Now the present invention shall be explained by the examples shown in the drawings. FIG. 3 is a side elevation of an example of using the prism of the present invention, and FIG. 4 is a top view of the same, wherein 5 is a prism used in the present invention, $5b$ is its totally reflecting plane or surface, $5a$ shows its incident plane or surface. In FIG. 3, upper counter light I enters into an ocular lens and enters into the pentagonal prism 3 through its surface $3d$, then after a series of internal reflection it is reflected from the bottom surface $3c$ at an angle of $\theta_o$ degree against an imaging optical axis and goes out of the surface $3d$. Then and there in a conventional device the counter light I directly enters into a photocell 4, but as a prism 5 is provided in the present invention the light transmits through the surface $5a$ of the prism 5 and is totally reflected at the surface $5b$ which forms an angle $\theta$ with the optical axis, therefore its direction is largely changed and will not reach the photocell 4, yet the ordinary regular light (shown by solid line) from a focusing plate transmits through and is refracted at the surface $5b$ and reaches the photocell 4. The angle $\theta$ formed by said surface must be within the scope defined by the following formula:

$$\sin^{-1}(1/N) - \theta_o° \leqq \theta \leqq \sin^{-1}(1/N) - \omega°$$

In the above formula, $N$ is the refractive index of the prism, and $\omega°$ is the photometric acceptance angle of the finder, while the left side of the formula indicates the condition for the undesired counter light to be totally reflected at the bottom surface 5b, and the right side indicates the condition for the regular light to be refracted and transmitted. $\omega°$ differs depending on the position of the photocell and on the finder.

As shown above in the present invention such prism, as having a surface which forms, with the optical axis on the plane of a pentagonal prism facing the ocular lens side or at rear of the same, an angle $\theta$ falling within the scope defined by:

$$\sin^{-1}(1/N) - 21° \leq \theta° \leq \sin^{-1}(1/N) - 10°$$
$$\theta_o° < 21°$$
$$\omega° < 10°,$$

or having an effect equivalent to the above, is placed between the pentagonal prism and the photocell thus the undesired light which is the counter light entering the ocular lens from upper direction and further entering into the pentagonal prism, and then tends to reach the photocell is totally reflected at the inner surface of the above mentioned prism in front of the photocell so that only ordinary imaging light transmits through the above-mentioned prism. Therefore, the measuring device of a single lens reflex camera with such arrangements just mentioned has the advantages that it can easily eliminate conventionally undesired effects of the counter light from the upper direction of an ocular lens or eyepiece by internal reflection within the pentagonal prism and it can largely reduce the error in measuring, and that in case of regular light, the position of the photocell can be moved upward from the conventional pentagonal bottom surface by the refractive effect of the prism so that leak in measurement is small and the arrangement (positioning) of component parts can be made compact.

Figure 5:
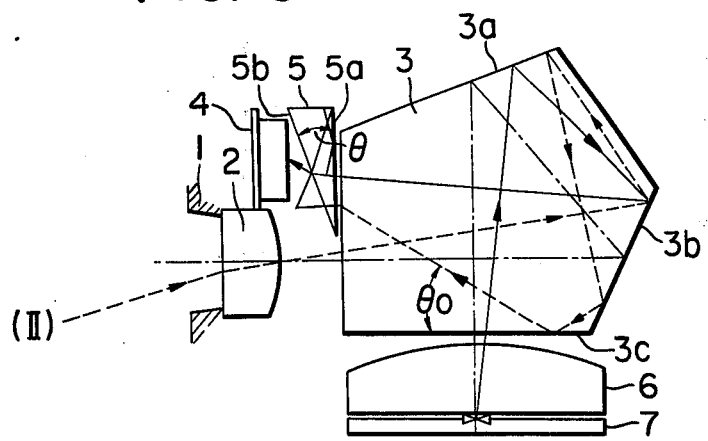
FIG. 5 is a side view of a light measuring device according to another embodiment of the present invention
Figure 6:
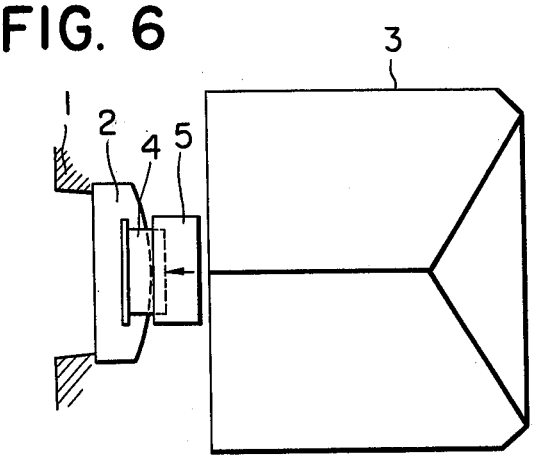
FIG. 6 is a top view of the invention of FIG. 5.

Next another example of the present invention shall be explained by FIG. 5 and FIG. 6. FIG. 5 is a side elevation of an example of use of the prism of the present invention, and FIG. 6 is its top view, wherein 5 is a prism used in the present invention, 5b is a totally reflective surface, and 5a is an incident surface.

In FIG. 5 the lower counter light II from somewhat lower direction from the center of an ocular lens enters a pentagonal prism from its plane 3d and after a series of internal reflections is reflected at the plane 3c at an angle of $\theta_o°$ against the optical axis and goes out of the place 3d. Now in the conventional method or device the counter light II directly enters into the photocell, but in the present invention by adopting the prism 5, the above mentioned counter light transmits through the surface 5a of the prism and is totally reflected at the surface (5b) which forms an angle $\theta$ with the optical axis, therefore its proceeding direction is greatly changed so that it will not reach the photocell 4, although the ordinary regular light (shown by solid line) from a focusing glass or plane is defracted at the surface 5b and transmits through the same thus reaching the photocell 4. The angle $\theta$ must be within the scope defined below:

$$\sin^{-1}(1/N) - \theta_o° \leq \theta \leq \sin^{-1}(1/N) - \omega°,$$

wherein $N$ is refractive index of the prism. The left side of the formula shows the condition for the counter harmful light to be totally reflected at the surface 5b, and the right side of the formula shows the condition for the regular light to be refracted at and transmits through the surface 5b. As shown above, the present invention is so arranged that a prism, having a surface forming with the optical axis, on the surface of the pentagonal prism facing the ocular lens side or at the rear of the pentagonal prism an angle $\theta$ which falls within the scope shown below:

$$\sin^{-1}(1/N) - 29° \leq \theta° \leq \sin^{-1}(1/N) - 14°$$
$$\theta_o° < 29°$$
$$\omega° < 14°,$$

or having such effect as equivalent to the above, is placed between the pentagonal prism and the photocell so that the undesired counter light, which enters the ocular lens from a lower direction then enters into the pentagonal prism reaching the photocell, is totally reflected at the inner surface of the above mentioned prism before the photocell, thus only the ordinary imaging light transmits through the same.

Figure 7:
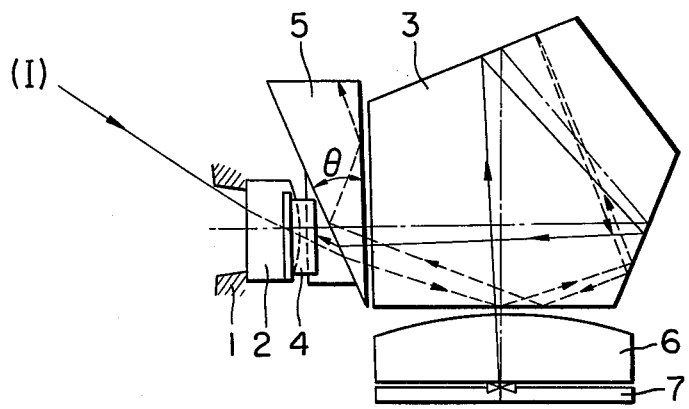
FIG. 7 is a side view of a light measuring device according to another embodiment of the present invention.

FIG. 7 shows another example, wherein the present invention is applied so that the light flux proceeding to both sides (left and right) of the ocular lens, out of the light fluxes other than the effective flux used by the finder coming out of the surface of the pentagonal prism facing the ocular lens, is properly measured.

The undesired light I (shown by broken line) entering into the ocular lens from upper direction enters into the pentagonal prism 3 from the plane facing the ocular lens and is reflected at its inner bottom surface, thus the light is subjected to a series of internal reflections then is reflected again at the bottom surface and transmits again through the plane facing the ocular lens. While the light will be directly entering into the photocell 4 in the conventional device, the light is, by the wedge shape prism 5 for the examples to which the present invention is applied, totally reflected internally, thus the undesired light I is prevented from entering into the photocell 4.

On the other hand, the regular light (shown by solid line) from the focusing plate is after coming out of the pentagonal prism refracted at and transmits through the prism 5 thus reaching the photocell 4.

Figure 8:
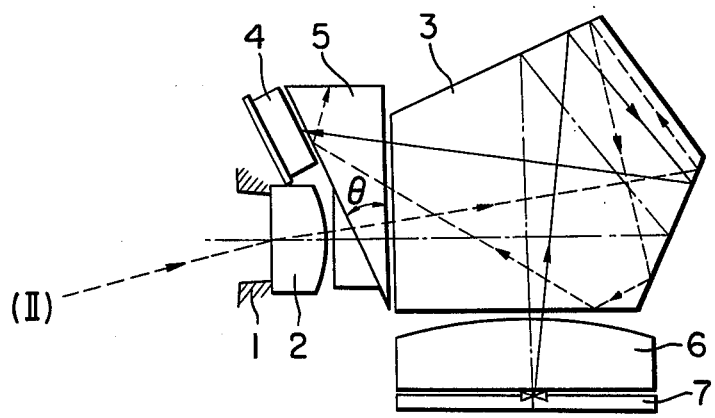
FIG. 8 is a side view of a light measuring device according to another embodiment of the present invention.
Figure 9:
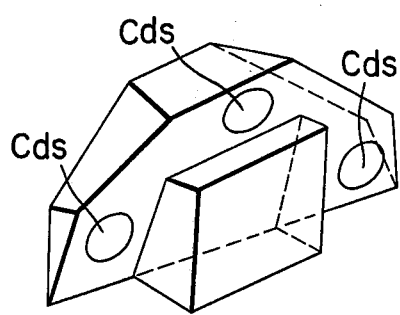
FIGS. 9 and 10 are perspective views respectively of wedge shape prisms used with the embodiments shown in FIGS. 7 and 8.
Figure 10:
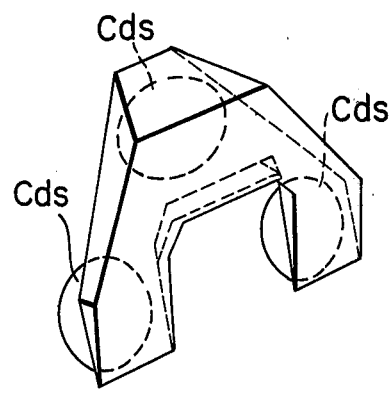

FIG. 8 shows an example wherein the present invention is applied in order to properly measure the light flux proceeding to the upper direction of the ocular lens out of the light fluxes other than the effective flux used at the finder coming out of the pentagonal prism at its surface facing the ocular lens.

The light II (shown by broken line) undesired for measuring entered into the ocular lens from somewhat lower portion thereof enters into the pentagonal prism 3 at its surface facing the ocular lens and after a series of reflections within the pentagonal prism 3 it is finally reflected at the bottom surface then comes to the surface of the pentagonal prism 3 facing the ocular lens, wherein while the light enters into the photocell 4 in a conventional device, the light is totally reflected by the wedge shape prism 5 in the example to which the present invention is applied. Thus the undesired light is prevented from proceeding to the photocell.

On the other hand, the regular light (shown by solid line) from a focusing plate is, after coming out of the pentagonal prism, refracted at and transmits through the prism 5 reaching the photocell 4.

In FIG. 7 and FIG. 8 a prism, having such surface that its angle $\theta$ falls within the scope of $$\sin^{-1}(1/N) - \theta_o° \leq \theta \leq \sin^{-1}(1/N) - \omega°$$

(wherein $N$ is the refractive index of the prism) or having such effect as equivalent to the above, is placed between the photocell and the pentagonal prism.

Figure 11:
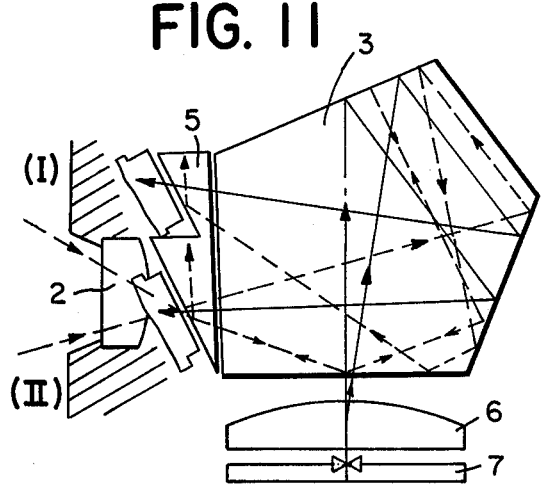
FIG. 11 is a side view of the applied embodiments of the present invention shown in FIGS. 7 and 8.
Figure 12:
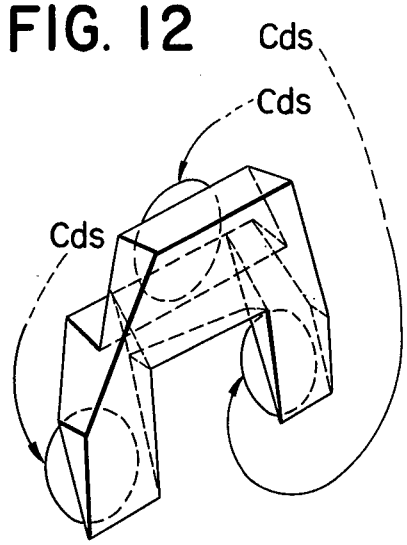
FIG. 12 is a perspective view of a wedge shape prism to be used in the embodiment shown in FIG. 11.

While the examples shown in FIG. 7 and FIG. 8 show a case wherein the light flux proceeding to both sides (left and right) of the ocular lens is measured and a case wherein the light flux proceeding to the upper direction of the ocular lens is measured, respectively, both kinds of light flux may be simultaneously measured. FIG. 11 shows such case as mentioned and FIG. 12 shows a modified wedge shape prism.

Figure 13:
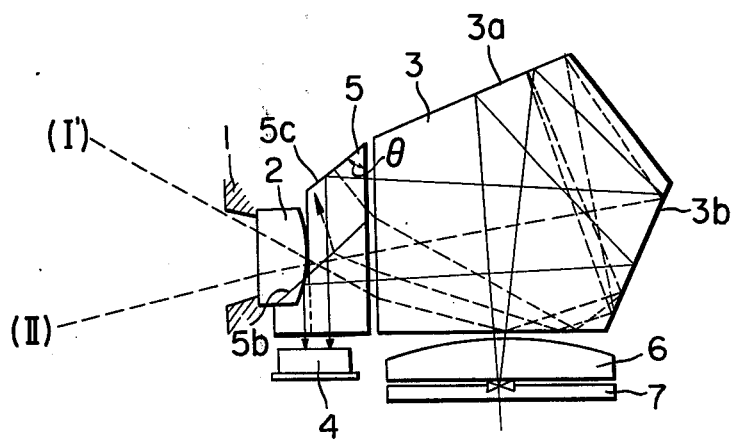
FIG. 13 is a side view of a light measuring device of still another embodiment of the present invention.

FIG. 13 shows, being different from the foregoing examples, an example wherein such a prism is provided as having the surfaces by which the counter light, which comes from the ocular lens and is totally reflected at the bottom surface of the pentagonal prism thus proceeding toward the ocular lens, is made to transmit the same and the regular light from a focusing glass and is totally reflected. In the drawing the undesired light I (shown by broken line) entering into the ocular lens from upper direction transmits through the reflecting surface 5b of the prism 5. And the undesired light II (shown by broken line) entering into the ocular lens from lower direction transmits through the reflecting surface 5c of the prism 5. On the other hand, the regular light (shown by solid line) is reflected at the reflecting surface and enters into the photocell provided at lower position in the drawing. The angle $\theta$ by the reflective surface must fall within the scope defined below:

$$\sin^{-1}(1/N) + \omega° \geq \theta \geq \sin^{-1}(1/N) - \omega°$$

wherein $N$ is refractive index of the prism and $\omega°$ is the measuring scope of the finder.

Figure 14:
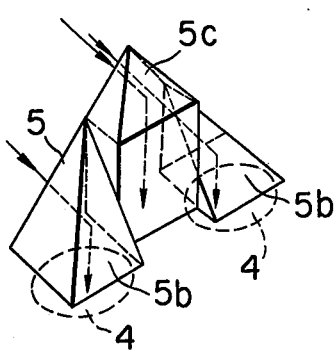
FIGS. 14 and 15 are perspective views of prisms, respectively, to be used in the embodiment shown in FIG. 13.
Figure 15:
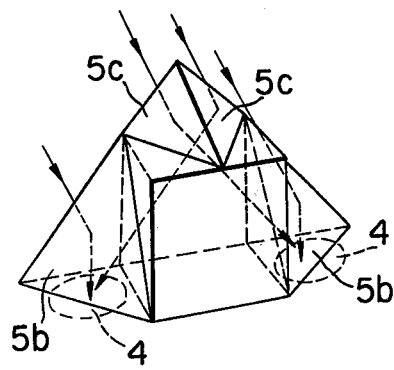

As have been explained above in the present invention a prism, having such surface as forming with the optical axis on the surface of the pentagonal prism facing the ocular lens side or at the rear of the prism an angle $\theta$ which falls within the scope defined by the above mentioned formula or having an effect equivalent to the above, is provided between a pentagonal prism and a photocell. The prism shown in FIG. 14 or FIG. 15 are modifications of the prism 5 of the foregoing examples.

As shown in the above mentioned examples the present invention provides a simple yet great improvement over the effect on the measuring error by the counter light from an ocular lens, which constituted disadvantages of such system as measuring the light other than the finder effective light flux coming out of the surface of the pentagonal prism facing the ocular lens.

What is claimed is:

1. A single lens reflex camera comprising:
   a pentagonal roof prism having a plurality of surfaces including a light entrance surface and a light exit surface,
   optical means for directing light from an objective lens in the camera toward the entrance surface,
   said surfaces being arranged to cause light incident upon said entrance surface from said optical means to emerge from the exit surface,
   an eyepiece near the exit surface for receiving light emerging from said exit surface,
   a photosensitive device near said exit surface for receiving light emerging from said exit surface;
   an optical element positioned in the path of light emerging from the exit surface and arranged to guide light emerging from the exit surface, and travelling toward the photosensitive device from one group of directions, toward the photosensitive device, and to guide light emerging from the exit surface, and travelling toward the photosensitive device from another group of directions, away from the photosensitive device.

2. A camera as in claim 1, wherein the light guided away from the photosensitive device is light entering the exit surface through the eyepiece and re-emerging from the exit surface after being reflected by said surfaces.

3. A device as in claim 1, wherein said exit surface includes a center part and an upper portion to the center part, and wherein said photosensitive device admits light from the upper portion of the center part of said exit surface, and wherein said optical element guides light toward the photosensitive device from the upper portion of the center part of the exit surface.

4. A camera as in claim 1, wherein said optical element includes a wedge shaped prism,
   a first surface of said prism being in parallel with said exit surface and a second surface of said prism being oblique to said exit surface to form a reflecting-transmitting surface.

5. A camera as in claim 4, wherein said reflecting-transmitting surface reflects light from the other group of directions and transmits light toward the photosensitive device emerging from the exit surface from the one group of directions.

6. A camera as in claim 5 wherein said reflecting-transmitting surface forms an angle $\theta$ with the exit surface of the pentagonal prism, wherein $$\sin^{-1}(1/N) - \theta_0 \leq \theta \leq \sin^{-1} 1N - \omega,$$

wherein $N$ is the refractive index of the prism, $\theta_0$ is an angle formed by the light from the other group of directions and $\omega$ is the acceptance angle of the photosensitive device.

7. A camera as in claim 4, wherein said reflecting-transmitting surface transmits light from the other group of directions and alters the direction of the light from the one group of directions toward said photosensitive device.

8. A camera as in claim 7, wherein said reflecting-transmitting surface forms an angle $\theta$ with the exit surface of the pentagonal prism, wherein $$\sin^{-1}(1/N) - \theta_0 \leq \theta \leq \sin^{-1}(1/N) - \omega$$

wherein $N$ designates the refractive index of the prism $\theta$ is the angle formed by the light from the other group of directions and $\omega$ is the acceptance angle of the photosensitive device.

9. A single lens reflex camera, comprising
   a pentagonal roof prism having a plurality of surfaces, one of said surfaces being an entrance surface and the other being an exit surface;
   optical means for directing light from an objective lens toward the entrance surface so that the light ultimately emerges from the exit surface;
   an eyepiece positioned near the exit surface for admitting light emerging from the central part of the exit surface;
   a plurality of photosensitive devices positioned respectively near the exit surface adjacent the eyepiece for receiving light emerging from the exit surface from other than the center part of the exit surface;
   a plurality of optical elements each positioned between one of the photosensitive devices and the exit surface, said optical elements each directing light emerging from the exit surface from one group of directions toward one of said photosensitive devices and each guiding light emerging from the exit surface from another group of directions away from the photosensitive devices.

10. A device as in claim 9, wherein light from the other group of directions includes light entering the exit surface through said eyepiece and reflected within the prism to emerge from the exit surface.

11. A single lens reflex camera comprising:
a pentagonal roof prism having a plurality of surfaces including a light entrance surface and a light exit surface,
optical means for directing light from an objective lens in the camera toward the entrance surface,
said surfaces being arranged to cause light incident upon said entrance surface from said optical means to be emitted from the exit surface,
said exit surface having a central portion, outside portions adjacent the central portion, and an upper portion above the central portion;
an eyepiece near the exit surface for receiving light emitted from said exit surface,
a photosensitive device near said exit surface for receiving light emitted from said exit surface;
an optical element positioned adjacent the outside portions and the upper portion and having a notch at the central portion for selectively guiding light from the upper portions and outer portions and for permitting light to pass by the optical element toward the eyepiece, said optical element guiding light emerging from the outer and upper portions from one group of directions toward the photosensitive device, and for guiding the light emerging from the upper and outer portions from another group of directions away from the photosensitive device.

12. A device as in claim 11, wherein the light guided away from the photosensitive device is light entering the exit surface through the eyepiece and re-emitted from the exit surface after being reflected by said surfaces.

13. A single lens reflex camera comprising:
a pentagonal roof prism having a plurality of surfaces including a light entrance surface and a light exit surface,
optical means for directing light from an objective lens in the camera toward the entrance surface,
said surfaces being arranged to cause light incident upon said entrance surface from said optical means to emerge from the exit surface,
an eyepiece near the exit surface for receiving light emerging from said exit surface,
said exit surface having a center portion, two outer portions, and an upper portion;
a photosensitive device near the exit surface for receiving light emerging from said exit surface,
an optical element positioned adjacent the outside portions and the upper portion and having a notch at the central portion for selectively guiding light from the upper portions and outer portions and for permitting light to pass by the optical element toward the eyepiece, said optical element guiding light emerging from the outer and upper portions from one group of directions toward the photosensitive device, and for guiding the light emerging from the upper and outer portions from another group of directions away from the photosensitive device.

14. A device as in claim 13, wherein the light guided away from the photosensitive device is light entering the exit surface through the eyepiece and re-emerging from the exit surface after being reflected by said surfaces.

15. A single lens reflex camera comprising:
a pentagonal roof prism having a plurality of surfaces including a light entrance surface and a light exit surface,
optical means for directing light from an objective lens in the camera toward the entrance surface,
said surfaces being arranged to cause light incident upon said entrance surface from said optical means to be emerged from the exit surface,
an eyepiece near the exit surface for receiving light emerging from said exit surface;
said exit surface having a central portion and outer portions,
a photosensitive device located adjacent the pentagonal prism near an outer portion of the exit surface and having an incident surface transverse to the exit surface,
a glass block located in the path of light emerging from the exit surface and having a reflecting-transmitting surface, said block being arranged so that the light from the entrance surface emerging from the exit surface is guided toward the photosensitive device and light entering the prism from the eyepiece and emerging from the exit thereof is guided away from the photosensitive device.

* * * * *